Dec. 21, 1965  R. L. FENNER ETAL  3,224,268
WEATHER RECORDING STATION
Filed Oct. 27, 1961  3 Sheets-Sheet 1
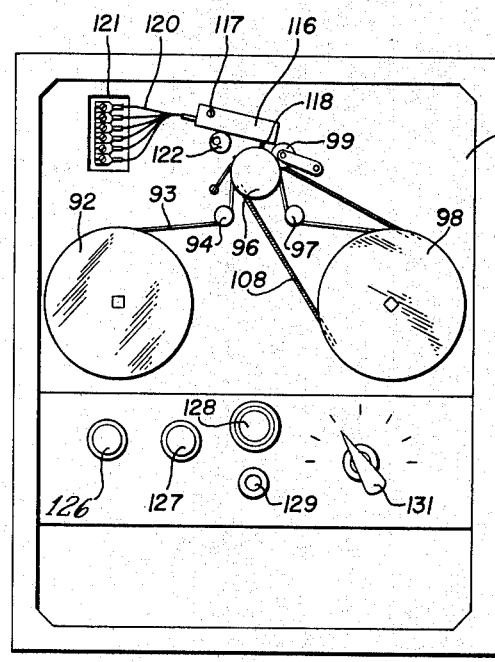
Fig. 2
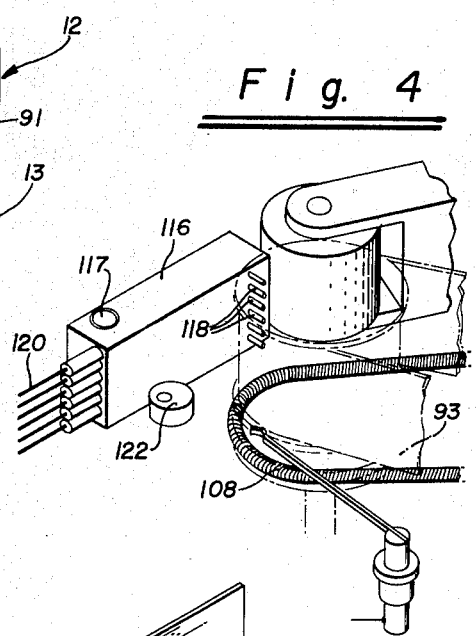
Fig. 4
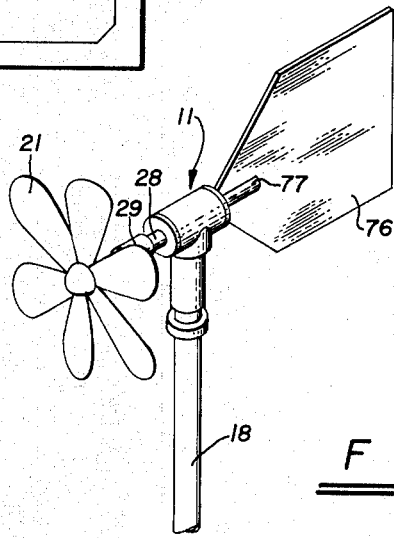
Fig. 1
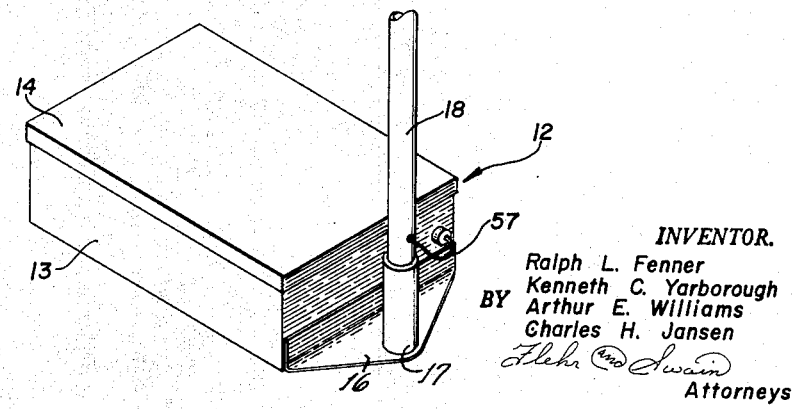
INVENTOR.
Ralph L. Fenner
Kenneth C. Yarborough
BY Arthur E. Williams
Charles H. Jansen
Attorneys

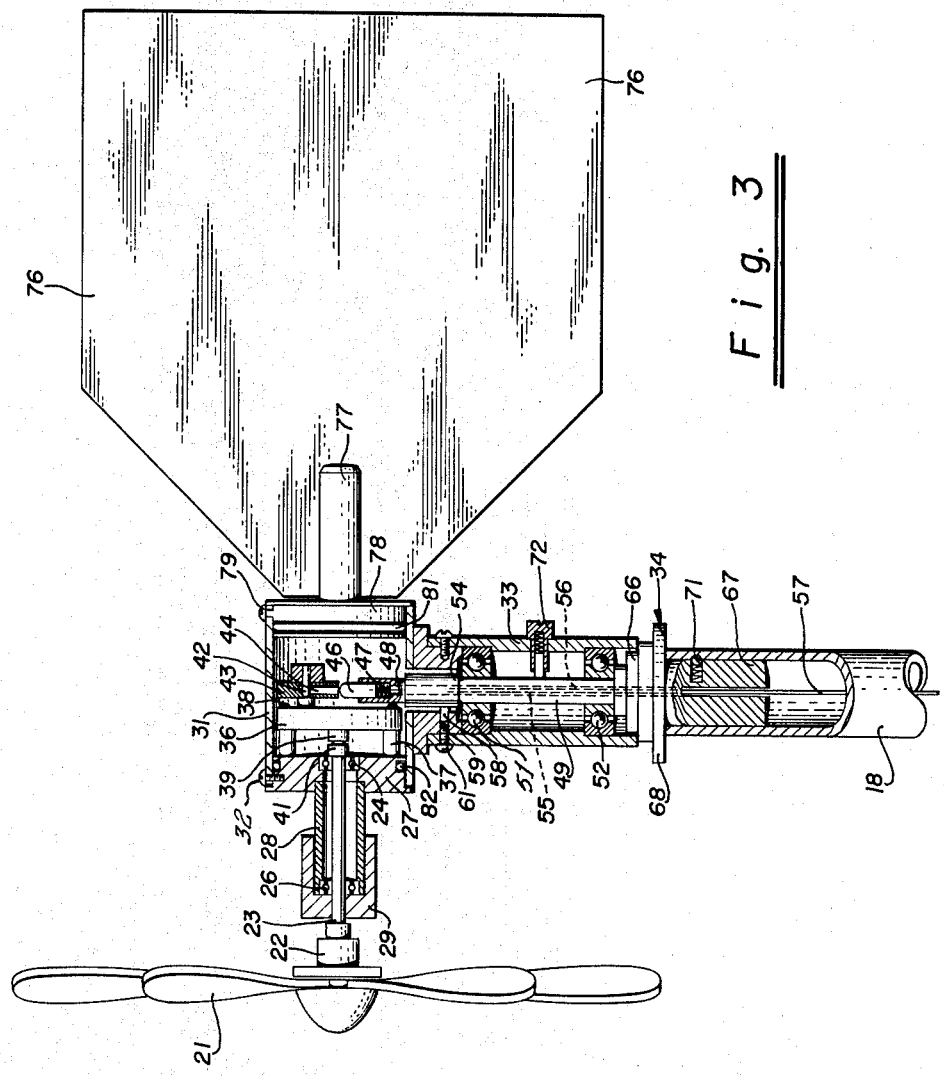

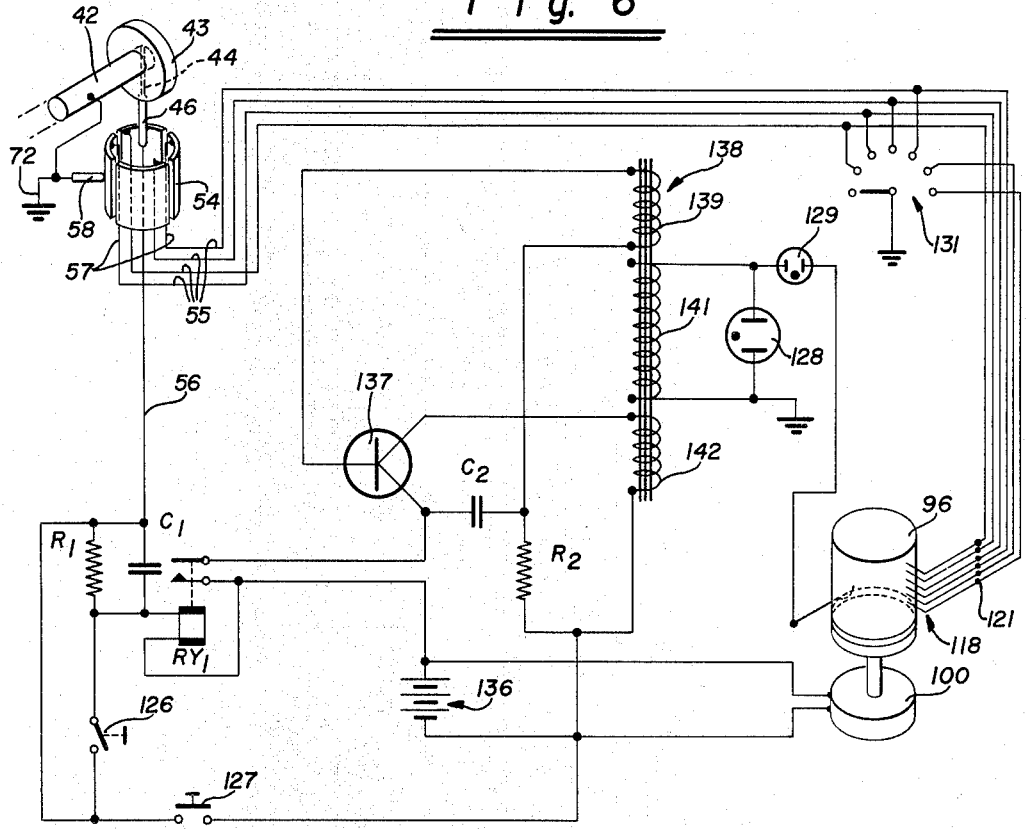
Fig. 6
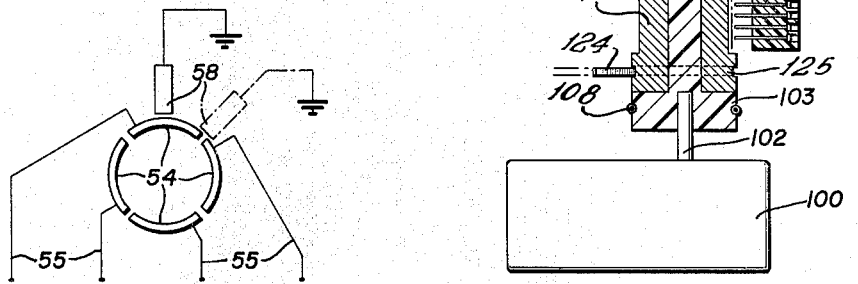
Fig. 7
Fig. 5
INVENTOR.
Ralph L. Fenner
Kenneth C. Yarborough
BY Arthur E. Williams
Charles H. Jansen
Attorneys

United States Patent Office

3,224,268
Patented Dec. 21, 1965

3,224,268
WEATHER RECORDING STATION
Ralph L. Fenner, 45 Harrison Ave., Sausalito, Calif.;
Kenneth C. Yarborough, 754 21st St., Richmond, Calif.;
Arthur E. Williams, 5807 Sherwood Forest Road, El
Sobrante, Calif.; and Charles H. Jansen, 629 26th St.,
Richmond, Calif.
Filed Oct. 27, 1961, Ser. No. 148,239
1 Claim. (Cl. 73—189)

This invention relates to a weather recording station and more particularly to a portable weather recording station.

At the present time there are on the market recorders for recording wind velocity. However, such recorders generally record wind direction and velocity by use of an analog trace that is, an ink trace which is made on a moving chart. Such an analog system has certain advantages. For example, such traces can be scanned rapidly by eye to give the relative speeds and directions over a period of time. However, such a system does not lend itself to numerical analysis because it is difficult to translate the analog information into digital form. There is therefore a need for a weather recording station which records wind direction and velocity in a digital form.

In general, it is an object of the present invention to provide a weather recording station in which wind velocity and direction are recorded in a digital form.

Another object of the invention is to provide a weather recording station of the above character which is self-contained.

Another object of the invention is to provide a weather recording station of the above character which can operate for relatively long periods of time on a small battery supply.

Another object of the invention is to provide a weather recording station of the above character in which particularly novel means is utilized for recording the wind velocity and direction.

Additional objects and features of the invention will appear from the following description in which the preferred embodiment has been set forth in detail in conjunction with the accompanying drawings.

FIGURE 1 is an isometric view of a weather recording station incorporating our invention.

FIGURE 2 is a plan view of the recording portion of the weather recording station.

FIGURE 3 is a side elevational view partially in cross section of the direction and velocity head of the weather recording station.

FIGURE 4 is an enlarged detail view of the electrodes and the capstan.

FIGURE 5 is a cross sectional view of the capstan.

FIGURE 6 is a diagram of the circuitry utilized in our weather recording station.

FIGURE 7 is a diagram partially schematic of the direct commutating means.

In general, our weather recording station consists of a direction and velocity head and a recorder connected to the direction and velocity head. The direction and velocity head consists of a support stand with a support member rotatably mounted on the support stand for rotation about a substantially vertical axis. A fan is rotatably mounted about one end of the support member and a wind vane is mounted on the other end of the support member and serves to face the fan into the wind so that the fan is rotated by the wind with a speed of rotation which is proportional to the wind velocity. The fan drives a commutator assembly. Circuit means is connected to the commutator means to produce pulses in accordance with the speed of rotation of the fan and means is provided for recording the pulses. The circuit means and the recording means also includes means for recording the pulses in different channels as the direction of the wind changes.

More particularly our weather recording station as shown in the drawings consists of a direction and velocity head 11 and a recorder 12. The recorder 12 includes a weatherproof housing 13 having a removable cover 14. The housing is also provided with an extension 16 which is aligned with the bottom wall of the housing. The extension 16 has mounted thereon a vertical tubular member 17 which is spaced from the housing 13 and serves as a carrying handle for the recorder as hereinafter described and as a receptacle for receiving a tubular support member 18. The tubular support member carries the direction and velocity head 11.

The direction and velocity head consists of a five bladed fan 21 mounted upon a hub 22. The hub is carried by a shaft 23. The shaft 23 is rotatably carried in a pair of bearings 24 and 26. Bearing 24 is mounted in a support member 27 and the bearing 26 is mounted in a tubular extension 28 of the circular member 27. A counterweight 29 is mounted on the tubular extension 28. The member 27 is mounted in a tubular support member 31 by suitable means such as screws 32. The major axis of the tubular support member 31 lies in a horizontal plane. The tubular member is secured to a downwardly extending tubular member 33 and is rotatably supported by a member 34 fixed to the support stand 18. A gear train 36 is mounted within the tubular support housing 31 upon the support member 27 by spacers 37 and screws 38. Connection is made between the shaft 23 and the gear train 36 by pin-type coupling members 39 and 41.

The output shaft 42 of the gear train is connected to commutator means which consists of a circular member 43 of insulating material fixed to the shaft 42. The insulating member 43 carries a conducting pin 44 which is grounded to the output shaft 42 of the gear train and serves as a velocity commutator for grounding purposes as hereinafter described. A wiping contact 46 is yieldably urged upwardly into continuous engagement with the insulating member 43 by a spring 47. The wiping contact 46 and the spring 47 are carried in a tubular member 48 of suitable insulating material such as Teflon. The insulating member 48 is mounted upon a metal shaft 49 which is rotatably mounted within the tubular housing 33 by a pair of bearings 51 and 52. A "Tru-arc" ring 59 is provided above the bearing member 51 and engages the rod 49 for supporting the insulating member 48 in a predetermined position. This serves to permit rotation of the fan into the wind while at the same time permitting the insulating member 48 to remain stationary.

Direction commutation means is also provided and consists of a plurality of metal commutator segments 54 fixed to the insulating member 48. Each of the segments 54 is connected to a separate wire 55 extending down through the insulating member. Another wire 56 is provided and is connected to the wiping contact 46. The wires 55 and 56 are bound together to provide a cable 57 which extends down through the tubular support member 18 and down into the recorder 12. A spring loaded wiping contact 58 is mounted in the tubular member 33 and is adapted to engage the commutator segments 54. A spring 59 yieldably urges the contact into engagement with the segments and a screw 61 is provided for adjusting the spring pressure.

The support member 34 is provided with an upper tubular extension 66 which fits into the tubular member 33. It is also provided with a lower tubular extension 67 which fits into the upper end of the tubular member 18. A collar or flange 68 is provided between the upper and lower portions and rests on the upper end of the tubular member 18 as shown particularly in FIGURE 3. A detent assembly 71 is prvoided in the head assembly for locking the head assembly in engagement with the tubular support member 18.

A vane 76 for directing the fan 21 into the wind is mounted upon a cylindrical member 77 which is a part of an end cap 78 mounted in the tubular support member 31 by suitable means such as screws 79. O-rings 81 and 82 are mounted in the members 78 and 27 respectively to provide a sealed enclosure within the tubular member 31.

A grounding contact 72 is mounted in the tubular member 33 and is adapted to engage the metal shaft 49 which supports the insulating member 48. This grounding contact has been provided because it has been found that it is relatively difficult to establish a good ground through either of the bearings 51 or 52. It is also desirable to establish ground in this manner because it prevents pitting of the bearings.

The recorder 12 in addition to the portions hereinbefore described also consists of a mounting plate 91 provided within the housing 13. The mounting plate 91 carries a tape reel 92 rotatably mounted thereon which supplies a paper tape. The tape passes around an idler roller 94 and over a capstan 96 to another idler roller 97 and to a take-up reel 98 rotatably mounted upon the mounting plate 91. The tape is yieldably urged into engagement with the capstan 96 by a rubber-covered spring-loaded roller 99. The capstan 96 is driven by suitable means such as an eight day clock not shown mounted below the face plate 91.

The capstan as shown particularly in FIGURE 5 consists of a shaft 102 upon which is mounted a circular member 103 of insulating material. The circular member 103 is provided with an insulated cylindrical extension 104 of a diameter substantially less than the diameter of the circular member 103. A cup-shaped conducting member 106 is secured over the top of the insulated cylindrical portion 104. A cap 107 of insulating material is mounted over the top of the conducting member 106 as shown particularly in FIGURE 5. A spring belt 108 is mounted on the circular portion 103 of the capstan and serves to drive the take-up reel 98.

An electrode holder 116 is pivotally mounted on the face plate 91 at 117. The holder carries a plurality (six) of electrodes 118 which are adapted to overlie the paper tape 93 as it passes over the conducting portion 106 of the capstan. Only four electrodes are required to record the four quadrants of wind direction, the other two electrodes can be used for other purposes such as recording temperature and moisture from information supplied from other transducers. Additional electrodes 118 and segments 54 can be provided if it is desired to record additional wind direction vectors to provide greater resolution. The electrodes 118 are spring loaded into engagement with the paper tape 93 by spring members 119 mounted in the holder 116 and urging the contacts into engagement with the paper tape. The spring members 119 are connected to the conductors 120 which are connected to the terminal block 121. The terminal block 121 is connected to the cable 57 which extends up through the tubular support member 118. A high voltage wiping contact 124 is disposed in a groove 125 provided in the lower extremity of the conducting member 106 and continuously engages the capstan as it is rotated.

Also mounted on the front control panel 91 is a reset switch 126, a test switch 127, a perforating voltage light 128, a marking current light 129 and a channel selector switch 131.

Also mounted within the housing 13 below the indicator panel 19 are the components comprising the circuitry shown in FIGURE 6. These include a battery 136, a relay $RY_1$, a transistor 137, capacitors $C_1$ and $C_2$, resistors $R_1$ and $R_2$ and a transformer 138 having windings 139, 141 and 142.

Operation of our weather recording station may now be briefly described as follows: Let it be assumed that it is desired to measure wind velocity and wind direction and that the weather recorder has been set in a proper location to measure these parameters. The wind vane 76 directs the fan 21 into the wind and the fan rotates at a speed which is proportional to the wind velocity. For example, if it is assumed that the fan is rotating at 1800 r.p.m. and the gear train 36 provides a reduction of 1800 to 1, the commutator member 43 and its contact member 44 engages the wiping contact 46 once in each 1800 revolutions of the fan.

When contact is made between elements 44 and 46, an RC circuit is charged consisting of the capacitor $C_1$ and resistor $R_1$. Charging current flows from the positive side of the battery 136 through the winding of relay $RY_1$ to energize relay $RY_1$. Relay $RY_1$ remains energized for the period of time that is required for charging of the capacitor $C_1$. The size of the capacitor $C_1$ can be chosen so that the proper period of time is obtained such as two seconds. Energizing of relay $RY_1$ closes its normally open contacts to turn on the high voltage oscillator consisting of the transistor 137, the transformer 138 and the capacitor $C_2$ and the resistor $R_2$.

The operation of the oscillator circuit is well known to those skilled in the art. In general when the oscillator is turned on by operation of the relay $RY_1$, a sudden pulse of current flows through the primary winding 142 as the capacitor $C_2$ charges rapidly. This is followed by a long period of no current flow during which time the capacitor $C_2$ is discharging through the resistor $R_2$. Each time current flows in the primary winding 142, a high voltage is induced in the secondary winding 141. The voltage produced in the secondary winding 141 is sufficient to cause firing of the high voltage indicator 128, the marking indicator 129 and to cause current to flow through the capstan to one of the electrodes 118 to ground as hereinafter described. The marking indicator 129 fires at a much lower voltage than the voltage drop from the platen to the pens 118 and therefore has no appreciable effect on the pulses which are produced. The high voltage indicator 128 serves as a current limiting means and protects the transformer in the event a short or excessive load develops across the secondary winding.

At the same time there is a heavy flow of current in the primary winding, the voltage is also induced in the feed-back winding 139. This induced voltage serves to bias the transistor 137 in such a way that it is opened quickly, that is, the action of the transistor is such that it conducts more rapidly than would be the case under normal operation of the transistor. The feed-back winding, therefore, causes an exaggerated current flow in the primary winding 142 of the transformer.

The resistor $R_2$ has such a value so that the oscillator has a desired oscillation rate as for example 100 to 200 pulses per second. The high voltage lead of the oscillator is connected to the wiping contact 124 which engages the conducting portion 106 of the capstan 96 so that the capstan has high voltage on it. The capstan 96 actually also serves as a high voltage platen for the electrodes 118. It is driven at a predetermined uniform speed as for example three inches per hour by the clock mechanism. The conducting portion of the capstan 96 is insulated with respect to ground and is actually held at the high voltage provided by the oscillator circuit. A recording will only be made by the electrode 118 which is grounded through the direction commutator assembly. An arc is created between the platen and the grounded electrode 118 to cause a small hole to be burned into the paper tape passing over the capstan each time the oscillator is turned on. Only one of the commutator segments 54 and the electrode connected thereto will be grounded at a time and therefore the recording will be in only one of the four possible channels representing the four different directions of north, south, east and west.

If the wind should be blowing in a direction which is approximately half way between two directions, as for example, in a northeasterly direction, and is shifting slightly from one commutator segment to another, a pulse will first be placed in the north quadrant and then thereafter a pulse in the east quadrant and then a hole in the north quadrant and so forth to indicate that the wind is blowing in a northeasterly direction.

One hole is made each time the movable contact 44 comes into engagement with the stationary contact 46. The capacitor $C_1$ is charged each time through the winding of the relay $RY_1$ which turns on the oscillator to cause a hole to be burned into the tape. After the hole is burned into the tape, the charging is completed and the relay $RY_1$ drops out to stop the operation of the oscillator circuit. As soon as the member 43 rotates sufficiently to open the contact between the movable member 44 and the stationary member 46, the charging circuit to the capacitor $C_1$ is interrupted and the capacitor $C_1$ discharges through the resistor $R_1$ so that it is ready to be charged again upon the next engagement of contacts 44 and 46.

From the foregoing it can be seen that a number of holes will be punched in the tape with the number of holes per inch being determined by the wind velocity. The holes will be punched in any of four rows or channels as determined by the direction of the wind.

The test switch 127 has been provided to connect the RC time circuit consisting of the capacitor $C_1$ and the resistor $R_1$ across the battery 136 to cause operation of the relay $RY_1$ and to cause a hole to be punched in the tape. The test switch 127 therefore performs the same function as the contacts 44 and 46 provided in the direction and velocity head 11. The reset switch is used to short out the capacitor $C_1$ to permit another test to be conducted immediately after a previous test has been made. Selector switch 131 permits the holes to be made in a selected channel. Under normal conditions, the resistor $R_1$ bleeds off the capacitor $C_1$ very slowly as for example in one-half minute. It is desirable that resistor $R_1$ have a very high value of resistance so that in the event there is a relatively long dwell period between the contacts 44 and 46 a high drain will not be placed on the battery 136.

The use of our weather recording station is also very advantageous in that it can be knocked down for transport. For example, if desired, the direction and velocity head can be removed from the supporting rod 18 and the supporting rod 18 can be removed from the receptacle 17. Thereafter these units can be carried separately. The recorder 12 can be carried by utilizing the receptacle 17 as a handle.

It can be seen from the foregoing that we have provided a new and improved weather recording station which is a self-contained unit and can be operated for a long period of time from a single battery. The tape which is produced by the weather recording station can be read visually or it can be passed through a reading device. The information contained on the tape is in digital form and can be readily translated without difficulty. The wind velocity in miles per minute is recorded as a frequency pattern. This frequency pattern can be interpreted from merely examining the tape. For example, where the holes are relatively closely spaced a high wind velocity is indicated whereas if they are far apart, a low velocity is indicated. In addition, it is possible to determine the wind direction merely by viewing the tape. It is also possible to count the wind velocity in miles per hour for any period of time merely by counting the number of holes punched in the tape during that period of time.

We claim:

In a weather recording station for recording whether information on a paper tape, a support stand, a support member rotatably mounted on said stand for rotation about a vertical axis, a fan rotatably mounted on one end of said support member for rotation about a horizontal axis, said fan being responsive to wind velocity, a wind vane mounted on the other end of said support member for directing the fan into the wind, a shaft affixed to said fan, a disc carried by said shaft, a movable contact member carried by said disc, a stationary contact yieldably engaging said disc and being adapted to be engaged by the movable contact carried by the disc as the disc is rotated by the fan, a plurality of commutator segments carried by said support stand, said commutator segments being arranged in a vertical direction so that each commutator segment represents a predetermined wind direction, a plurality of electrodes adapted to be mounted adjacent the paper tape on one side of the paper tape, a platen adapted to be mounted on the other side of the paper tape, means connecting said electrodes to said commutator segments so that one electrode is provided for each commutator segment, brush means connected to said shaft and engaging the commutator segments as the support member rotates on said stand in accordance with the wind direction, means including a single oscillator for generating high voltage pulses connected between said platen and said brush means, and means connected to said stationary contact member for energizing the high voltage pulse generating means each time the stationary contact is engaged by the movable contact carried by the disc so that a high voltage pulse is produced by the high voltage pulse generating means whereby the paper tape is marked with a plurality of pulses in which the number of pulses extending longitudinally of the paper indicates the wind velocity and wherein the positioning of the pulses laterally of the paper tape indicates the wind direction.

References Cited by the Examiner

UNITED STATES PATENTS

| | | | |
|---|---|---|---|
| 2,500,746 | 3/1950 | Ellenberger | 73—188 X |
| 2,608,859 | 9/1952 | Sontag et al. | 73—189 |
| 2,648,980 | 8/1953 | Wood et al. | 73—189 |
| 2,730,694 | 1/1956 | Williamson | 346—74 |
| 2,742,783 | 4/1956 | Jasse | 73—189 |
| 2,870,383 | 1/1959 | Mazzarella | 73—189 |
| 2,923,861 | 2/1960 | Colt. | 73—189 |
| 3,119,260 | 1/1964 | Karmin | 73—189 |

OTHER REFERENCES

"Wind Velocity Telemetering System," by Beaulieu, R. and Neal, G., Electronics, July 15, 1960, vol. 33, pages 68, 69 and 70.

RICHARD C. QUEISSER, *Primary Examiner.*

ROBERT L. EVANS, *Examiner.*